May 21, 1935.  B. THOMSON  2,001,856
SYNCHRONIZING CLUTCH
Filed Nov. 3, 1932  2 Sheets-Sheet 1
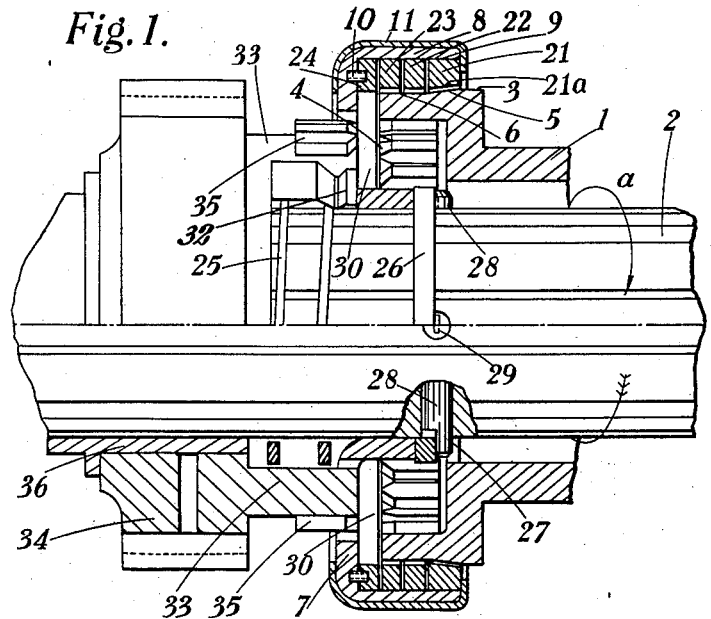
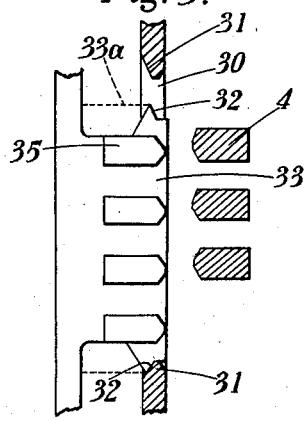
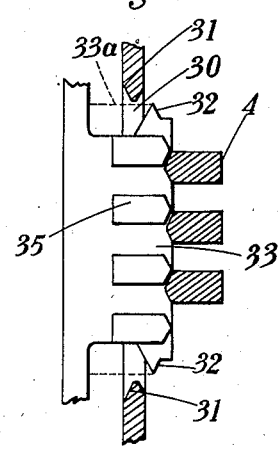
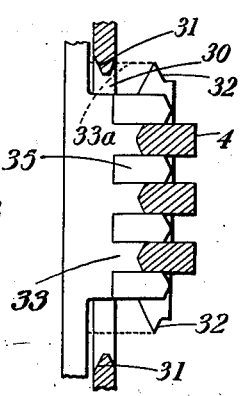
INVENTOR
Bernard Thomson
BY
Blackmore, Spencer & Flint
ATTORNEYS May 21, 1935. B. THOMSON 2,001,856
SYNCHRONIZING CLUTCH
Filed Nov. 3, 1932  2 Sheets-Sheet 2
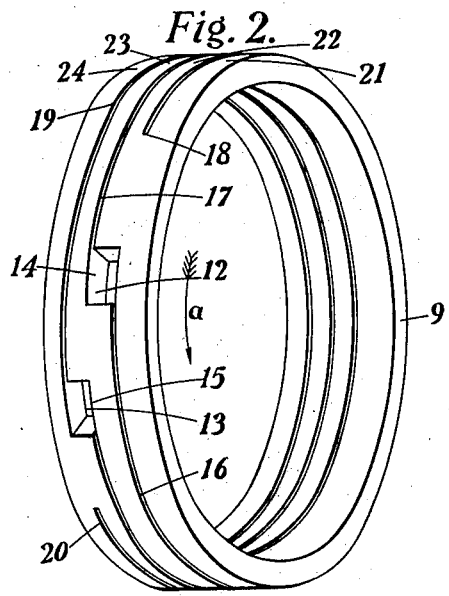
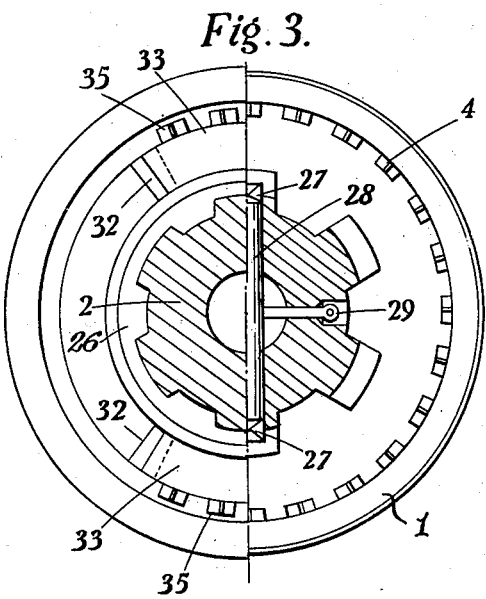
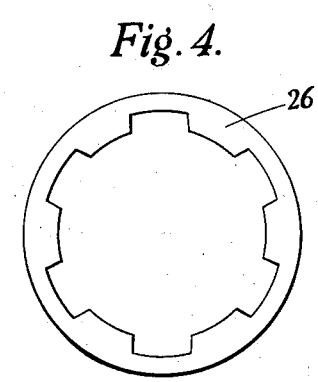
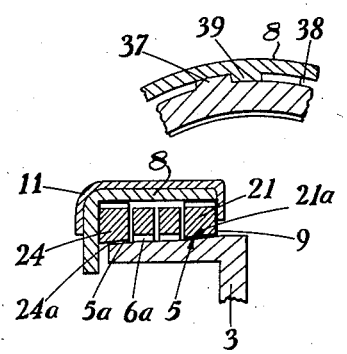
INVENTOR
Bernard Thomson
BY
Blackmore, Spencer & Flint
ATTORNEYS Patented May 21, 1935

2,001,856

UNITED STATES PATENT OFFICE 2,001,856

SYNCHRONIZING CLUTCH

Bernard Thomson, Combe Close, Woldingham, England, assignor to General Motors Corporation, Detroit, Mich., a corporation of Delaware Application November 3, 1932, Serial No. 640,970
In Great Britain November 6, 1931

13 Claims. (Cl. 192—53)

My invention relates to synchronizing clutch arrangements of the type described, for example, in the specifications of my British Letters Patent Nos. 332,302 and 339,694.

It is an object of my invention to improve the synchronizing efficiency of a composite jaw and friction clutch mechanism wherein the friction clutch elements are engaged to bring coaxial rotative parts to substantially the same speed prior to coupling said parts positively.

My invention consists in a synchronizing combination including a friction clutch in which one of the clutch members is formed in such a manner that on engagement with its co-acting member, the torque transmitted through the normal friction surfaces is supplemented by an additional torque transmitted independently of these surfaces.

My invention further consists in the improved friction clutches, and synchronizing clutch arrangements embodying them to be hereinafter described.

Referring now to the accompanying drawings:

Figure 1 shows a longitudinal section of a synchronizing clutch arrangement embodying one form of my invention.

Figure 2 shows a view in perspective of the scroll ring of the friction clutch shown in Figure 1.

Figure 3 shows a cross section of the arrangement illustrated in Figure 1, the view on the right of the centre line showing the positioning means for the stop ring for the intermediate member, whilst that on the left of the centre line shows the compound teeth on the gear wheel.

Figure 4 shows a detail view of the stop ring for the intermediate member.

Figures 5, 6 and 7 are plans of a development of one of the compound teeth on the gear wheel and one of the apertures in the intermediate member illustrating stages of the engaging operation of the synchronizing clutch.

Figures 8 and 9 show longitudinal sectional and cross-sectional elevations respectively, of part of a modified form of friction clutch.

In the patent specification above referred to, I have described and illustrated arrangements of synchronizing clutches in which an intermediate member is interposed between the members to be positively coupled together. This intermediate member, which is positively driven through a lost motion connection by one of the members to be positively coupled and is adapted to be frictionally engaged with the other member to be positively coupled, in the coupling operation acts to prohibit engagement of the members to be positively coupled while their speeds are asynchronous.

In carrying the present invention into effect, according to one form, and as applied by way of example to an arrangement of synchronizing clutch for a gear box of a motor vehicle, similar to that described and illustrated with reference to Figure 12 of British Patent Specification No. 339,694, the slidable clutch member, 1, Figures 1 and 3, is splined on the shaft 2, so that it is slidable axially thereon but cannot rotate independently of this shaft. The slidable clutch member 1, is provided with a rim, 3, on the inner periphery of which a ring of teeth, 4, is formed. The teeth, 4, are adapted to transmit the power between the slidable clutch member, 1, and a gear wheel to be hereinafter described. The external periphery of the rim, 3, is formed with a conical part, 5, and a cylindrical portion, 6, the diameter of the cylindrical portion being equal to the smallest diameter of the conical part.

On the shaft, 2, an intermediate member, 7, is rotatably mounted and is formed with a rim, 8, within which a friction clutch element, 9, is arranged. Friction clutch element, 9, because of its peculiar construction, is herein designated a "scroll" ring for convenience of identification. The inner end of the scroll ring, 9, is attached to the rim, 8, by pins, 10, while a retaining ring, 11, holds the scroll ring in position within the rim. The pins, 10, transmit the torque between the scroll ring, 9, and the intermediate member 7.

The construction of the scroll ring, 9, is illustrated in Figure 2. The scroll ring, 9, is constructed from a solid metal ring by forming two similar rectangular holes, 12 and 13, which are angularly spaced apart from one another as shown and are arranged so that their opposite sides, 14 and 15, respectively, are in the same plane perpendicular to the axis of the ring. From the hole, 12, two saw cuts, 16 and 17, extend in opposite directions, the saw cuts being parallel to one another and to the ends of the scroll ring, 9. The saw cut, 16, terminates at the point, 18, while the saw cut, 17, terminates at the hole, 13. From the hole, 13, a saw cut, 19, parallel to the saw cuts 16 and 17, extends to the point, 20.

The scroll ring, 9, for purposes of description, is assumed to be cut through by planes perpendicular to the ring axis which coincide with the saw cuts which are connected by the holes 12 and 13 and the portions of the ring separated by such planes have been hereinafter designated for convenience by the term "coils". The several coils between the saw cuts, it will be apparent, may expand or contract like a helix upon relative rotation of the end portions of the ring; but because the several saw cuts are in parallel planes and connected by the described holes 12 and 13 the coils need not be spaced so far apart as if they were turns of a helix.

The coil, 21, Figures 1 and 2, of the scroll ring, 9, which, it is apparent, is not elastically expansible or contractible, has a conical bore, 21a, to correspond to the conical part, 5, of the rim, 3, of the slidable clutch member, 1, while the bore of the intermediate coils, 22 and 23, is greater than that of the diameter of the cylindrical or parallel sided portion, 6, of this rim. The bore of the coil, 24, of the scroll ring, 9, is less than that of the intermediate coils, 22 and 23, and slightly greater than that of the parallel sided portion, 6, of the rim, 3. The scroll ring, 9, and the rim, 3, thus form the co-acting friction clutch members between the slidable clutch member, 1, and the intermediate member, 7.

The intermediate member, 7, in the disengaged position of the synchronizing clutch, is maintained by a spring, 25, so that it abuts against a stop ring, 26, Figures 1, 3 and 4. The stop ring, 26, is splined on the shaft, 2, and abuts against the reduced ends, 27, of a pin, 28, which passes through the shaft, 2. The pin, 28, is secured by means of a split pin, 29.

As the ends, 27, of the pin, 28, project above the male splines on the shaft, 2, the female splines on the slidable clutch member, 1, must be of sufficient depth to allow this member to pass freely over the ends of this pin during the movement of the member, 1, in engaging or in disengaging the members to be positively coupled together.

The intermediate member, 7, is provided with two apertures, 30, Figures 1 and 5 to 7, the radial faces, 31, of which are inclined as shown in Figures 5 to 7. The faces, 31, of the apertures, 30, are adapted to engage with corresponding faces, 32, on two axial projections, 33, which are formed on the gear wheel, 34, so that the intermediate member has a lost motion positive driving connection with the gear wheel. The faces, 31 and 32, on the sides of the apertures, 30, and the projections, 33, respectively, which engage with one another during the coupling operation, function as checking means to bar or hinder advance of the slidable element 1 into positive engagement with its companion element 34 during asynchronous rotation of elements 1 and 34. The contours of these checking faces are determined by the relative velocities of the shaft, 2, and the gear wheel, 34.

The projections, 33, on the gear wheel, 34, are of compound formation having superposed teeth, 35, thereon which are adapted to engage with the teeth, 4, on the slidable clutch member, 1, for positively transmitting the power between the shaft, 2, and the gear wheel.

The radial depths of the apertures, 30, on the intermediate member, 7, are sufficient to permit the intermediate member to pass freely over the compound projections, 33, in the coupling operation.

The gear wheel, 34, is rotatably mounted on a sleeve, 36, attached to the shaft, 2, and is not capable of axial movement relatively to this shaft.

If the gear wheel, 34, and the shaft, 2, are both rotating in the same direction, for example in the direction of the arrow, a, shown in Figure 1, and the gear wheel is rotating at a less speed than that of the shaft, and if it is desired under these conditions to positively couple the shaft, 2, and the gear wheel, 34, in power transmitting relationship, the slidable clutch member, 1, is moved to the left by its fork, not shown, so that the conical part, 5, of the rim, 3, is brought into frictional engagement with the conical bore, 21a, of the coil, 21, of the scroll ring, 9. The frictional engagement of these parts causes the deformable portions of the intermediate coils, 22 and 23, of the scroll ring, 9, to be wound tightly around the parallel sided portion, 6, of the rim, 3, and in this manner a torque supplementary to the torque transmitted by the frictional engagement of the parts 5 and 21, is introduced. The holes, 12 and 13, permit the necessary deformation of the scroll ring, 9, to take place. The reaction introduced by the above torques on the engaged faces, 31 and 32, of the intermediate member, 7, and the teeth, 33, on the gear wheel, 34, as explained in the patent specification referred to above, acts to prohibit engagement of the teeth, 35, and the teeth, 4, under asynchronous speed conditions of the gear wheel, 34, and the shaft, 2. The relative positions of one of the apertures, 30, in the intermediate member, 7, and the co-acting projection, 33, when synchronization is taking place, is shown in Figure 5.

On synchronism of the speeds of the shaft, 2, and the gear wheel, 34, being attained, the axial pressure exerted by the fork on the slidable clutch member, 1, acting on the engaged faces, 31 and 32, causes the intermediate member, 7, to partially rotate relatively to the gear wheel, 34, into the position shown in Figure 6, and thereafter permits the slidable clutch member, 1, together with the intermediate member, 7, to be moved to the left so that the teeth, 4 and 35, may engage with one another as shown in Figure 7.

The movement of the intermediate member, 7, to the left takes place against the action of the spring, 25, which returns the intermediate member against the stop ring, 26, when the slidable clutch member, 1, is returned to the disengaged position.

If the gear wheel, 34, is rotating in the same direction as before but at a greater speed than that of the shaft, 2, which rotates in the same direction, and frictional engagement is effected between the conical part, 5, of the rim, 3, and the coil, 21, of the scroll ring, 9, then the deformable portions of the coils, 22 and 23, of the scroll ring are expanded radially so that these portions are forced against the rim, 8, of the intermediate member, 7, and the total torque transmitted between the intermediate member and the slidable clutch member, 1, under these conditions is only that transmitted through the frictional engagement of the co-acting conical surfaces of the part, 5, and the coil, 21. The engaging operation of the power transmitting teeth, 4 and 35, is effected in a similar manner to that hereinbefore described, the faces, 31 and 32, of the apertures, 30, and projections, 33, which are in engagement at the commencement of the coupling operation being, however, the faces opposite to those in engagement when the gear wheel, 34, is rotating slower than the shaft, 2.

In the example above described, the supplementary torque transmitted to the intermediate member, 7, resulting from the contraction radially of the deformable portions of the coils, 22 and 23, of the scroll ring, 9, is only obtained when the gear wheel, 34, is being accelerated. In the application of my invention to gear boxes for motor vehicles, this uni-directional effect in practice entails no material disadvantage, as when the gear wheel, 34, is being decelerated, the oil resistance of the parts assists in producing synchronization of the parts to be positively coupled, while on the other hand, when the gear wheel, 34, is being accelerated, the oil resistance acts to oppose the acceleration, but this opposition is easily overcome by the increased torque obtained through the scroll ring.

In the application of my invention to the arrangement shown in Figure 12, in British Patent Specification No. 339,694, it has been found that the internal face of the scroll ring sometimes jams on the conical and parallel sided portions with which it co-acts. In Figure 1, of the present specification, for example, the coil, 21, and the deformable portions of the coils, 22 and 23, may, under certain circumstances, cling tightly to the conical part, 5, and the parallel portion, 6, of the slidable clutch member, 1. When this occurs, the teeth, 4, of the slidable clutch member, 1, and the apertures 30, of the intermediate member, 7, are held in rigid relationship to one another and act as a single rigid part as the frictionally engaged parts, for the time being, are practically jammed into one another. These conditions, however, do not persist for any substantial interval of time but they may continue sufficiently long to prevent the power transmitting teeth, 4 and 35, sliding smoothly into engagement with one another.

In order to enable smooth engagement of the power transmitting teeth, 4 and 35, to be effected under all practical conditions, the form of the projections, 33, which are operative in synchronizing the speeds of the shaft, 2, and the gear wheel, 34, and also are operative in prohibiting engagement under asynchronous conditions are reduced in width behind the faces, 32, as shown by the full lines, (Figs. 5, 6 and 7), so that when synchronization of the speeds of the wheel, 34, and the shaft, 2, has been effected and the movement for the engagement of the teeth, 4 and 35, has commenced, the intermediate member, 7, may rotate relatively to the gear wheel, 34, and pass radially behind the face, 32, as shown in Figure 7.

If the projections, 33, were formed with flush sides as shown by the dotted lines, 33a, the intermediate member, 7, could not pass radially behind the faces, 32, and to enable the power-transmitting teeth, 4 and 35, to engage from the position shown in Figure 6, the relative positions of the aperture, 30, and the teeth, 4, would have to be altered by the intermediate member, 7, performing a partial rotation relative to the slidable clutch member, 1. Such partial relative rotation of the intermediate member, 7, and the slidable clutch member, 1, involves slipping of the friction surface of the coil, 21, over the conical part, 5, and also of the engaging surfaces of the coils, 22 and 23, over the parallel sided portion, 6, of the slidable clutch member.

It will be evident that the cutting away of the projections, 33, behind the faces, 32, or "reverse flanking" of the projections, 33, can be applied both to scroll ring or like friction clutches of the type herein described and also to solid cone friction clutches if the latter are formed with a small cone angle and liable to stick in the engaged position.

Further, in arrangements of synchronizing clutches in which the means, operative in the synchronizing operation and acting to prohibit engagement under asynchronous conditions, are formed separately from the power-transmitting means, the former means may be reverse flanked, and also such means may be reverse flanked when they also act as power-transmitting teeth in other synchronizing clutch arrangements.

In Figures 8 and 9, I have shown a modified form of scroll ring by means of which a torque supplementary to the torque transmitted through the friction surfaces, may be introduced both when the gear wheel, 34, is being accelerated and decelerated. In this example, the scroll ring, 9, is constructed in a similar manner to that above described with the exception that on the coil, 24, of the scroll ring, a conical face, 24a, is formed in addition to that on the coil, 21. The scroll ring, 9, is also formed so that it acts as a spring forcing the end coils, 21 and 24, apart.

The rim, 3, is also formed as before with a conical part, 5, which co-acts with the face, 21a, of the coil, 21, and also with an additional conical part, 5a, which co-acts with the conical face, 24a. The part, 6a, of the rim, 3, extending between the conical parts, 5 and 5a, is parallel sided or cylindrical.

On the external periphery of the coils, 21 and 24, projections, 37 and 38, are formed and are adapted to engage with a projection, 39, formed internally on the rim, 8, of the intermediate member, 7. A certain amount of lost motion is introduced between the projections, 37 and 38, and the projection 39, the former projections being disposed on opposite sides of the latter projection.

By suitably arranging the projections, 37 and 38, in relation to the projection, 39, the deformable portions of the coils, 22 and 23, of the scroll ring, 9, are contracted around the parallel portion, 6a, of the rim, 3, irrespective of whether the gear wheel, 34, is being accelerated or decelerated.

By means of my invention, an improved form of friction clutch is provided in which a substantially increased torque may be transmitted.

Although I have described my invention as applied by way of example to a synchronizing clutch arrangement of the type described in Figure 12 of British Patent Specification No. 339,694, it may be applied to other forms of synchronizing clutch arrangements. My invention may also be embodied in friction clutches for purposes other than synchronizing clutch arrangements.

Modifications may be made in the example of my invention above described within the scope of the appended claims.

What I claim is:—

1. Synchronizing clutch mechanism comprising companion toothed clutch elements adapted to be coupled and uncoupled and cooperating companion friction clutch elements adapted to be frictionally engaged before coupling of the toothed clutch elements in order to bring the latter to approximately the same speed by friction transmitted torque prior to interlocking them; the first of said friction clutch elements being fixed with respect to one of the toothed clutch elements, and the second friction clutch element capable of axial movement and having a driving connection with respect to the other toothed clutch element, said second friction clutch element comprising an advance engageable friction component, adapted to engage preliminarily the friction surface of its companion, and a relatively yieldable component arranged to seize the friction surface of said companion in response to rotation imparted to the advance engageable component by the preliminary engagement thereof, thereby transmitting a torque supplemental to that transmitted by the advance engageable component.

2. A combination as defined in claim 1 wherein the second friction clutch element is mounted with a lost motion driving connection in a position between the toothed clutch elements, and is equipped with checking means cooperating with mating checking means in fixed relation to the toothed clutch element with respect to which the intermediate friction element is in lost motion driving connection.

3. A synchronizing clutch mechanism comprising toothed clutch elements one of which is movable into interlocking engagement with the other; a cooperating friction clutch element rigid with respect to one toothed clutch element; a second friction clutch element capable of axial movement and having a lost motion driving connection with respect to the other toothed clutch element; cooperating inclined checking surfaces on the second friction clutch element and one of the toothed clutch elements, arranged to engage one another in the movement of the toothed clutch elements toward intermeshing engagement, and means providing space rearward of the checking surfaces on the toothed clutch element to allow angular movement thereinto of the second friction clutch element.

4. A synchronizing clutch mechanism comprising a shaft, companion toothed clutch elements, one of which is provided with projections parallel with the axis and spaced from the shaft, said projections being equipped with clutch teeth adapted to mesh with the teeth of its companion; a friction clutch element fixed with respect to one of said toothed clutch elements; an intermediate friction clutch element disposed between the toothed clutch elements, said intermediate friction clutch element having openings therethru wider than said spaced projections on said toothed clutch element, and disposed in position to provide a lost motion driving connection between said toothed clutch element and the intermediate friction clutch element, and coacting checking surfaces on the sides of the openings and the ends of the projections.

5. A synchronizing clutch mechanism as defined in claim 4 wherein the projections equipped with clutch teeth are of reduced width rearward of the checking surfaces thereon.

6. A synchronizing clutch mechanism as defined in claim 4, in combination with a stop to position the intermediate friction clutch element in neutral position, and a coiled spring disposed about the shaft between it and the projections on one of the toothed clutch elements arranged to yieldably force the intermediate friction clutch element against the stop.

7. In mechanism for coupling two axially alined rotatable members; a friction clutch element having a tapering surface merging into a cylindrical surface; a companion friction clutch element having an unyielding portion provided with a coacting tapering friction surface, an unyielding portion spaced therefrom and a yieldable coil connecting the two unyielding portions adapted to seize the cylindrical surface of the first named friction clutch element in response to rotation imparted by the engagement of the tapering portion of the first named friction clutch element with the unyielding tapering portion of the companion friction clutch element.

8. In mechanism for coupling two axially alined rotatable members, a friction clutch element having a friction surface tapering at least in part, in driving connection with one member, a companion friction clutch element comprising a supporting part in driving connection with the other member, a scroll ring anchored to the supporting part at one end, said scroll ring comprising a continuous rigid coil having an internal tapering friction surface at the other end, and a yieldable coil embracing the friction surface of the first named friction clutch element and disposed between the annulus having the tapered surface and the anchored end.

9. Mechanism as defined in claim 8 wherein the scroll ring comprises a continuous internally tapered unyielding coil at each end connected by a yieldable coil, and the friction clutch surface is tapered at each end with a cylindrical surface between.

10. Mechanism as defined in claim 8 wherein the scroll ring comprises a continuous unyielding coil at each end connected by a yieldable coil, and means to anchor one of the end coils to the supporting member.

11. Mechanism as defined in claim 8, in which the first named friction clutch element has a friction face composed of two tapering surfaces merging into an intermediate cylindrical surface, the companion friction clutch element comprising a scroll ring consisting of unyielding continuous end coils joined by an intermediate yieldable coil, the end coils having internally tapered surfaces, and lost motion anchoring means adapted to check rotation of one of the end coils and permit limited rotation of the other with respect to the supporting means.

12. In mechanism for coupling two axially alined rotatable members, a first friction clutch element in driving connection with one member, a second friction clutch element comprising a peripherally flanged supporting part in driving connection with the other member, a scroll ring housed within the flange of the supporting part, said scroll ring consisting of a yieldable coil anchored at one end to the supporting part and having at the other end an advance engageable coil adapted to be engaged with the first friction clutch element before engagement thereof by the yieldable coil, thereby developing an initial torque which is increased by the consequent contraction of the yieldable coil.

13. In mechanism for coupling two axially alined rotatable members, a first friction clutch element, having two tapering surfaces and an intermediate cylindrical surface, in driving connection with one member, a second friction clutch element comprising a peripherally flanged supporting part in driving connection with the other member, a scroll ring housed within the flange of the supporting part, said scroll ring consisting of an internally tapering continuous unyieldable coil at each end, connected by an intermediate yieldable coil, stop means on the inner circumference of the flange of the supporting part and angularly spaced coacting stops on each of the unyieldable coils one of which is adapted to engage said stop means on the flange on one side thereof and the other arranged to engage said stop means on the other side thereof with lost motion, in order that the yieldable coil may be caused to contract in either direction of rotation of the first friction clutch element.

BERNARD THOMSON.